(12) United States Patent
Euliss et al.

(10) Patent No.: US 9,243,595 B2
(45) Date of Patent: Jan. 26, 2016

(54) MULTI-PATH PURGE EJECTOR SYSTEM

(71) Applicant: Ford Global Technologies, LLC, Dearborn, MI (US)

(72) Inventors: William Euliss, Canton, MI (US); Kevin William Plymale, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 452 days.

(21) Appl. No.: 13/744,292

(22) Filed: Jan. 17, 2013

(65) Prior Publication Data

US 2014/0196694 A1    Jul. 17, 2014

(51) Int. Cl.
*F02M 25/08* (2006.01)
*F02B 37/16* (2006.01)

(52) U.S. Cl.
CPC ........... *F02M 25/0872* (2013.01); *F02M 25/08* (2013.01); *F02M 25/089* (2013.01); *F02M 25/0836* (2013.01); *F02B 37/164* (2013.01)

(58) Field of Classification Search
CPC ............. F02M 25/08; F02M 25/0809; F02M 25/0836; F02M 25/0872; F02M 25/089
USPC ................................ 123/518–520; 73/114.39
See application file for complete search history.

(56) References Cited

U.S. PATENT DOCUMENTS

| | | | |
|---|---|---|---|
| 4,962,784 A | 10/1990 | Collins | |
| 5,005,550 A * | 4/1991 | Bugin et al. | 123/520 |
| 5,363,889 A | 11/1994 | Simpson et al. | |
| 6,267,106 B1 | 7/2001 | Feucht | |
| 6,578,573 B2 | 6/2003 | Koch | |
| 6,880,534 B2 * | 4/2005 | Yoshiki et al. | 123/520 |
| 7,252,077 B2 | 8/2007 | Berggren | |
| 7,350,512 B1 | 4/2008 | Meacham et al. | |
| 7,373,930 B1 * | 5/2008 | Hadre | 123/520 |
| 7,900,608 B2 * | 3/2011 | Peters et al. | 123/518 |
| 8,047,185 B2 | 11/2011 | Ulrey et al. | |
| 8,511,285 B2 * | 8/2013 | Konohara et al. | 123/520 |
| 8,924,133 B2 * | 12/2014 | Hadre et al. | 701/107 |
| 2012/0016566 A1 | 1/2012 | Cunningham et al. | |

* cited by examiner

*Primary Examiner* — Lindsay Low
*Assistant Examiner* — Robert Werner
(74) *Attorney, Agent, or Firm* — Julia Voutyras; Alleman Hall McCoy Russell & Tuttle LLP (57) ABSTRACT

Systems and methods for a multi-path purging ejector are disclosed. In one example approach, a dual path purge system for an engine comprises an ejector including a restriction, first and second inlets, and an outlet, at least one break-point at the restriction or inlets, and a shut-off valve coupled to the outlet.

18 Claims, 4 Drawing Sheets

MULTI-PATH PURGE EJECTOR SYSTEM

BACKGROUND/SUMMARY

An ejector or venturi may be used as a vacuum source in dual path purging systems in an engine for fuel vapor recovery. For example, an inlet of an ejector may be coupled to an engine intake upstream of a compressor via a hose or duct and an outlet of the ejector may be coupled to an intake of the engine downstream of the compressor via a hose or other conduit. Motive fluid through the ejector provides a vacuum at an ejector suction inlet which may be coupled to a fuel vapor canister to assist in purging the fuel vapor canister during boosted operation.

In some examples, the motive fluid may contain fuel vapors, untreated engine emissions, and/or engine crankcase vapors. If the ejector develops a leak or if one or more hoses or ducting coupled to the ejector becomes degraded, it may be possible for gases to escape to the atmosphere. For example, leaks may be manifested at the inlets of the ejector or at the outlet of the ejector, e.g., when the ejector is stressed causing breakage or degradation in the body of the ejector device. As another example, leaks may be manifested when hoses, conduits, or ducting coupled to the inlets or outlet of the ejector degrade, break, or decouple from the ejector.

Some approaches diagnose and detect leaks in ejector system components adjacent to the ejector inlets and/or upstream of the ejector inlets. For example, using a variety of sensors in an engine system, leaks may be detected in hoses, conduits, or ductwork coupled to the inlet of the ejector or at other locations in an ejector system upstream of the ejector outlet. However, such approaches fail to diagnose or detect leaks in an ejector system at or downstream of the ejector outlet. For example, a hose or other ducting may be used to couple the outlet of an ejector to an engine intake at a position upstream of a compressor. If such a hose degrades, or decouples from the ejector outlet, the resulting leak in the ejector system may remain undetected leading to increased emissions and degradation in engine operation.

The inventors herein have recognized the above-mentioned disadvantages and have developed a dual path purge system for an engine. In one example approach, a multi-path purge system, such as a dual-path system) for an engine comprises: an ejector including an orifice, first and second inlets, and an outlet hard-mounted to an intake of the engine, and at least one break-point at the orifice or inlets. As another example approach, a multi-path purge system for an engine comprises: an ejector including an orifice, first and second inlets, and an outlet, at least one break-point at the orifice or inlets, and a shut-off valve coupled to the outlet.

In this way, break-points in the ejector inlets or orifice may direct leaks away from the ejector outlet to the inlets of the ejector where they may be detected without additional sensors or logic. Further, a shut-off valve coupled to the ejector outlet may be closed in response to a detected leak in order to reduce unwanted emissions due to leaks in a tube coupling the ejector outlet to the engine intake. Further, by coupling the ejector outlet directly to the intake via a hard-mount, stresses applied to the ejector may cause the ejector to degrade along the specified break-points adjacent to the inlets so that the leak may be detected and mitigating actions may be performed. Specifically, the approach may reduce the need to monitor all sections of an ejector to diagnose the ejector for leaks. Further, the approach may reduce a number of sensors required to monitor an ejector for leaks. Further still, ejector leaks may be determined without adding any additional sensors to the vehicle system.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
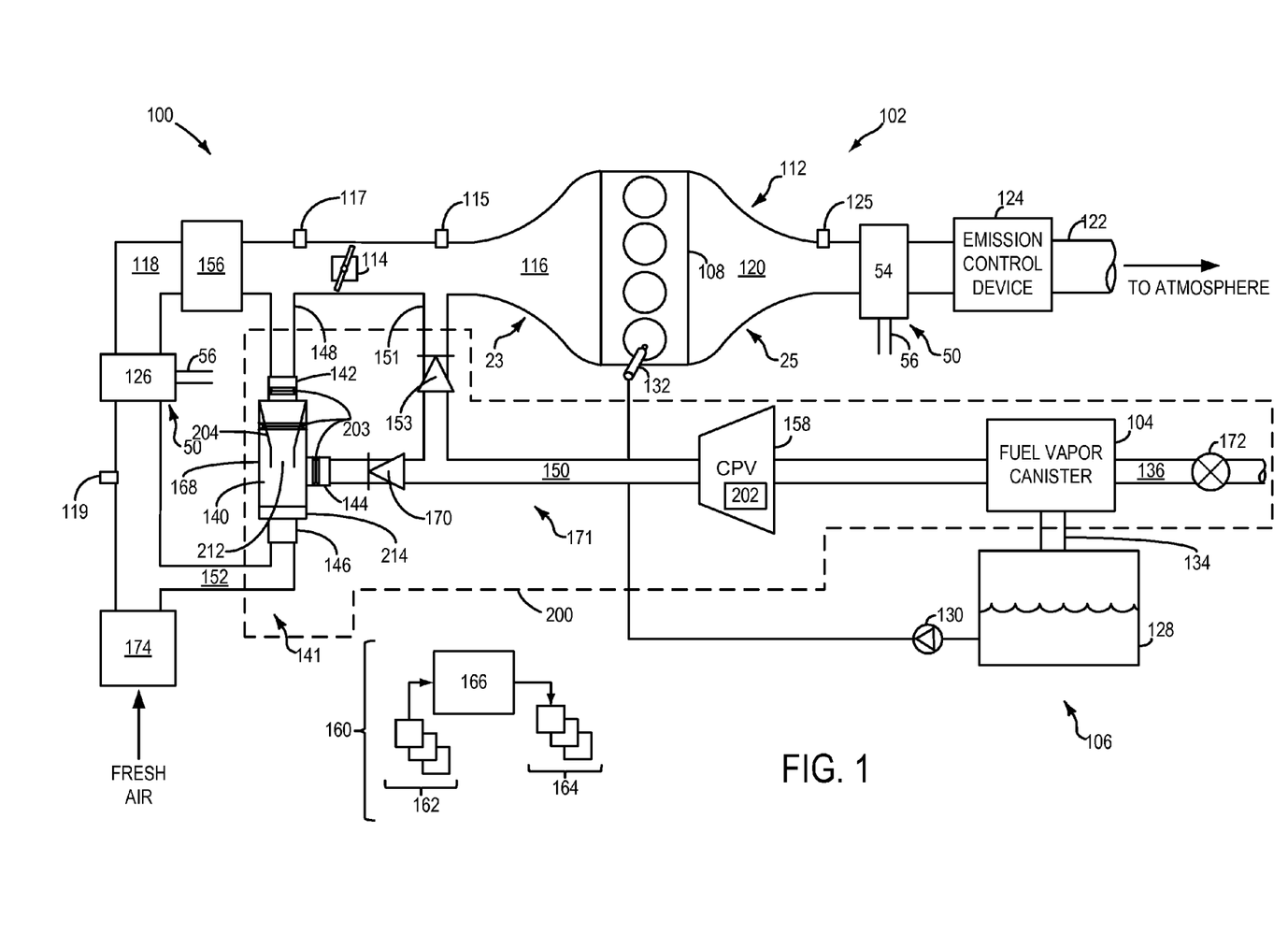
FIGS. 1 and 2 show schematic diagrams of example vehicle systems with dual path purge ejector systems.
Figure 2:
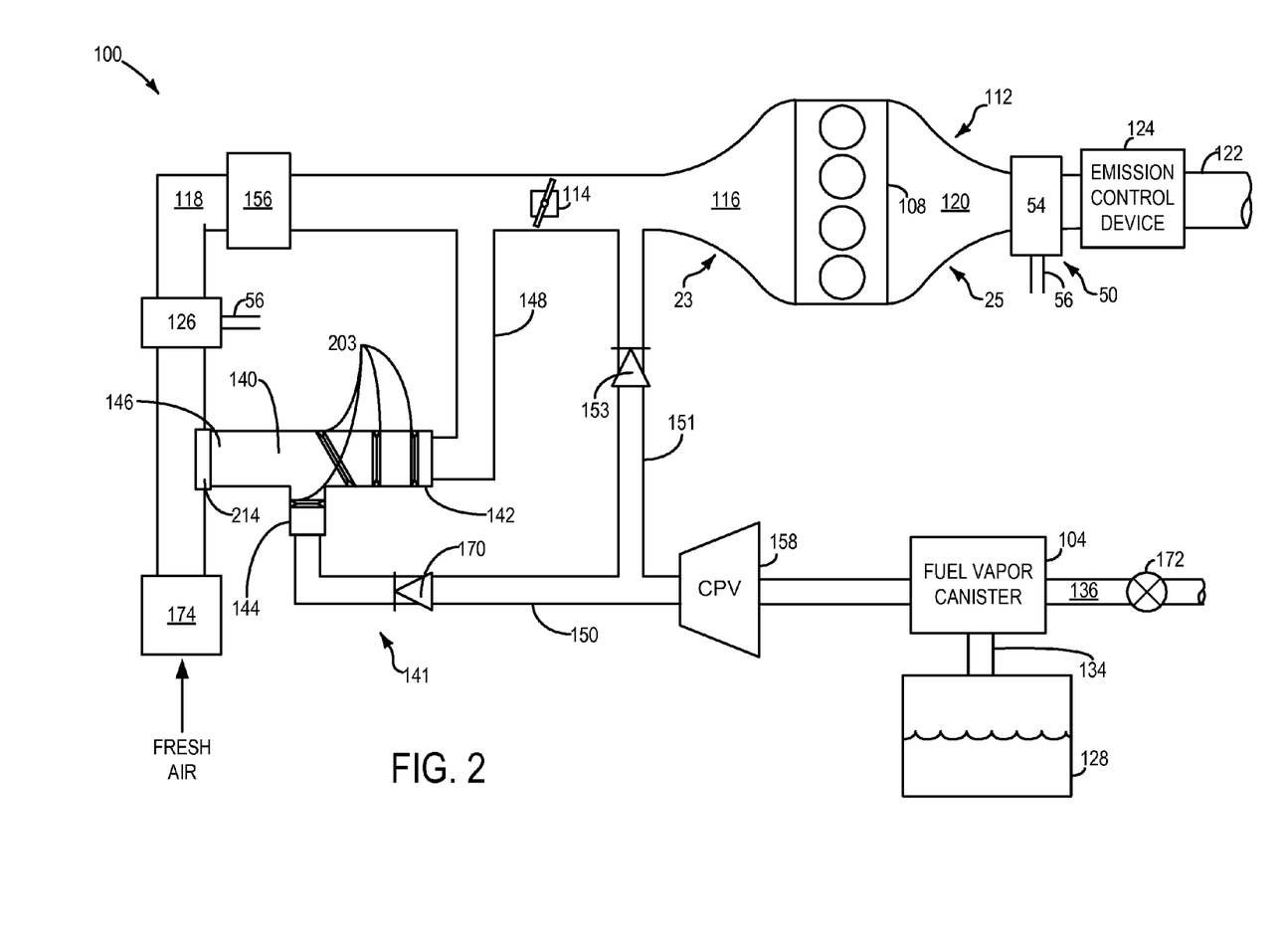
Figure 3:
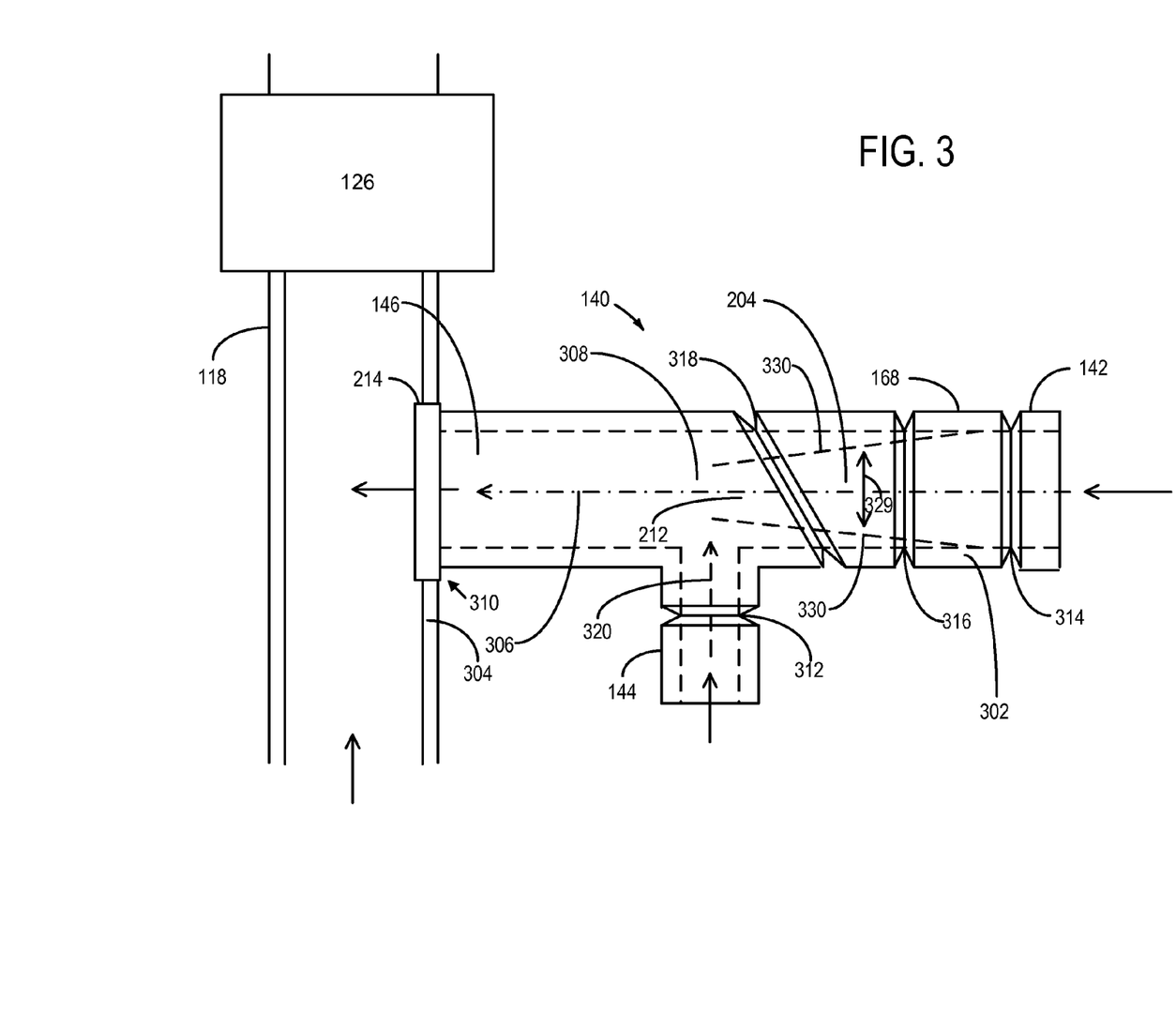
FIG. 3 shows an example ejector system in accordance with the disclosure.
Figure 4:
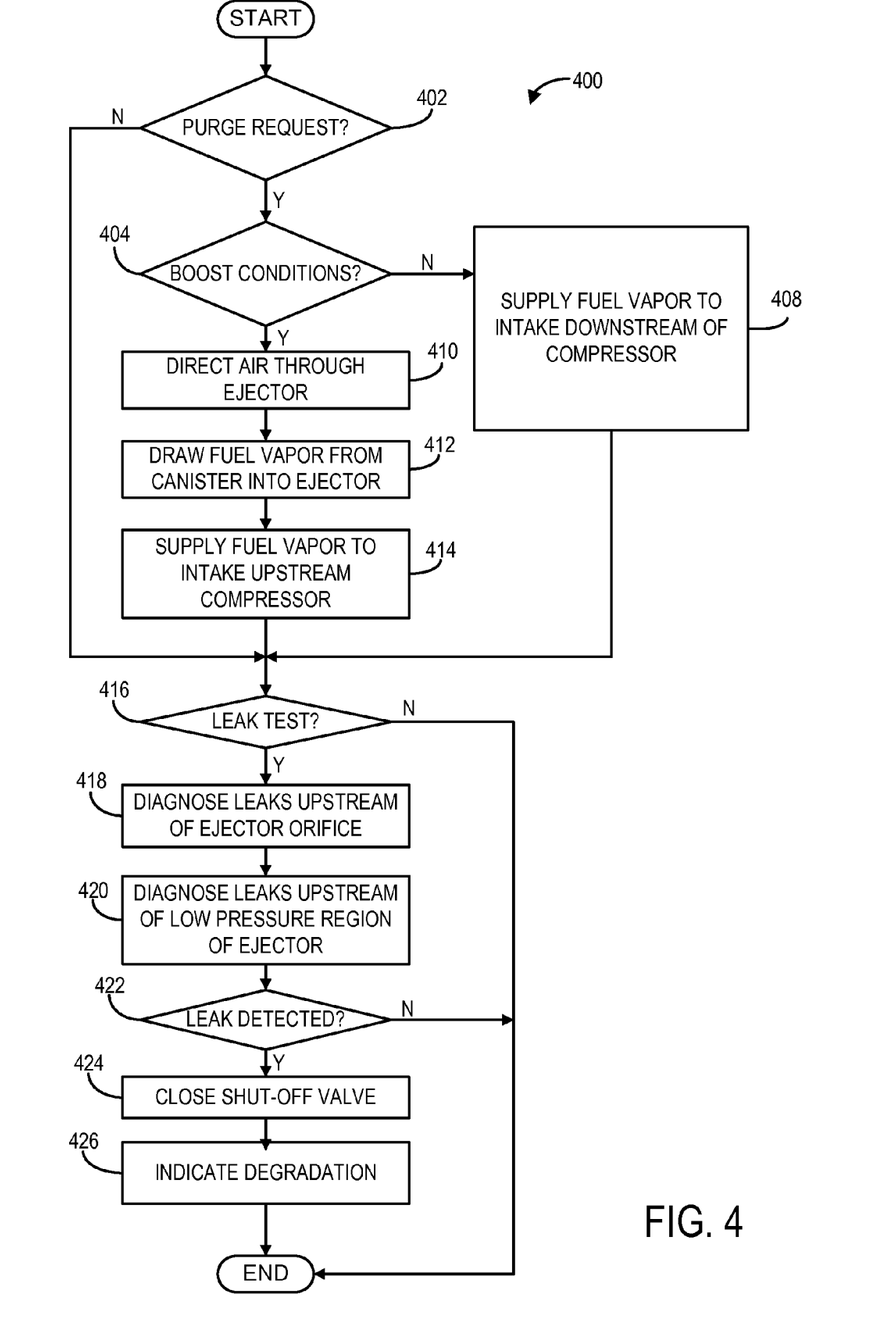
FIG. 4 shows an example method for a dual path purge system in accordance with the disclosure.

The present description is related to diagnosing leaks in an ejector system included in a dual path purge system in a vehicle, such as the example vehicles systems shown in FIGS. 1 and 2. As described above, leaks, e.g., leaks due to stresses to the ejector and/or degradation in ejector system components such as hoses or ducting, may be diagnosed and detected in system components at or upstream of inlets to the ejector. As shown in the example ejector or venturi system in FIG. 3, in order direct leaks upstream of an outlet of the venturi so that the leaks may be detected, calibrated break-lines or break-points may be included throughout a body of the ejector. Further, as shown in FIG. 3, the outlet of the ejector may be hard-mounted directly to an intake of the engine so that leaks in the ejector occur adjacent to ejector inlets where they may be detected. As shown in FIG. 4, such an ejector system may be used during boosted engine operation to purge fuel vapor from a canister into the engine intake. Further, leaks may be diagnosed at locations in the ejector system upstream from the ejector outlet and mitigating actions may be performed in response to a detected leak.

Turning to the figures, FIG. 1 shows a schematic depiction of a vehicle system 100. The vehicle system 100 includes an engine system 102 coupled to a fuel vapor recovery system 200 and a fuel system 106. The engine system 102 may include an engine 112 having a plurality of cylinders 108. The engine 112 includes an engine intake 23 and an engine exhaust 25. The engine intake 23 includes a throttle 114 fluidly coupled to the engine intake manifold 116 via an intake passage 118. An air filter 174 is positioned upstream of throttle 114 in intake passage 118. The engine exhaust 25 includes an exhaust manifold 120 leading to an exhaust passage 122 that routes exhaust gas to the atmosphere. The engine exhaust 122 may include one or more emission control devices 124, which may be mounted in a close-coupled position in the exhaust. One or more emission control devices may include a three-way catalyst, lean NOx trap, diesel particulate filter, oxidation catalyst, etc. It will be appreciated that other components may be included in the vehicle system, such as a variety of valves and sensors, as further elaborated below.

Throttle 114 may be located in intake passage 118 downstream of a compressor 126 of a boosting device, such as turbocharger 50, or a supercharger. Compressor 126 of turbocharger 50 may be arranged between air filter 174 and throttle 114 in intake passage 118. Compressor 126 may be at least partially powered by exhaust turbine 54, arranged between exhaust manifold 120 and emission control device 124 in exhaust passage 122. Compressor 126 may be coupled to exhaust turbine 54 via shaft 56. Compressor 126 may be configured to draw in intake air at atmospheric air pressure and boost it to a higher pressure. Using the boosted intake air, a boosted engine operation may be performed.

An amount of boost may be controlled, at least in part, by controlling an amount of exhaust gas directed through exhaust turbine 54. In one example, when a larger amount of boost is requested, a larger amount of exhaust gases may be directed through the turbine. Alternatively, for example when a smaller amount of boost is requested, some or all of the exhaust gas may bypass turbine via a turbine bypass passage as controlled by wastegate (not shown). An amount of boost may additionally or optionally be controlled by controlling an amount of intake air directed through compressor 126. Controller 166 may adjust an amount of intake air that is drawn through compressor 126 by adjusting the position of a compressor bypass valve (not shown). In one example, when a larger amount of boost is requested, a smaller amount of intake air may be directed through the compressor bypass passage.

Fuel system 106 may include a fuel tank 128 coupled to a fuel pump system 130. The fuel pump system 130 may include one or more pumps for pressurizing fuel delivered to fuel injectors 132 of engine 112. While only a single fuel injector 132 is shown, additional injectors may be provided for each cylinder. For example, engine 112 may be a direct injection gasoline engine and additional injectors may be provided for each cylinder. It will be appreciated that fuel system 106 may be a return-less fuel system, a return fuel system, or various other types of fuel system. In some examples, a fuel pump may be configured to draw the tank's liquid from the tank bottom. Vapors generated in fuel system 106 may be routed to fuel vapor recovery system 200, described further below, via conduit 134, before being purged to the engine intake 23.

Fuel vapor recovery system 200 includes a fuel vapor retaining device, depicted herein as fuel vapor canister 104. Canister 104 may be filled with an adsorbent capable of binding large quantities of vaporized HCs. In one example, the adsorbent used is activated charcoal. Canister 104 may receive fuel vapors from fuel tank 128 through conduit 134. While the depicted example shows a single canister, it will be appreciated that in alternate embodiments, a plurality of such canisters may be connected together. Canister 104 may communicate with the atmosphere through vent 136. In some examples, a canister vent valve 172 may be located along vent 136, coupled between the fuel vapor canister and the atmosphere, and may adjust a flow of air and vapors between canister 104 and the atmosphere. However, in other examples, a canister vent valve may not be included. In one example, operation of canister vent valve 172 may be regulated by a canister vent solenoid (not shown). For example, based on whether the canister is to be purged or not, the canister vent valve may be opened or closed. In some examples, an evaporative leak check module (ELCM) may be disposed in vent 136 and may be configured to control venting and/or assist in leak detection.

Conduit 134 may optionally include a fuel tank isolation valve (not shown). Among other functions, fuel tank isolation valve may allow the fuel vapor canister 104 to be maintained at a low pressure or vacuum without increasing the fuel evaporation rate from the tank (which would otherwise occur if the fuel tank pressure were lowered). The fuel tank 128 may hold a plurality of fuel blends, including fuel with a range of alcohol concentrations, such as various gasoline-ethanol blends, including E10, E85, gasoline, etc., and combinations thereof.

Fuel vapor recovery system 200 may include a dual path purge system 171. Purge system 171 is coupled to canister 104 via a conduit 150. Conduit 150 may include a canister purge valve (CPV) 158 disposed therein. Specifically, CPV 158 may regulate the flow of vapors along duct 150. The quantity and rate of vapors released by CPV 158 may be determined by the duty cycle of an associated CPV solenoid 202. In one example, the duty cycle of the CPV solenoid may be determined by controller 166 responsive to engine operating conditions, including, for example, an air-fuel ratio. By commanding the CPV to be closed, the controller may seal the fuel vapor canister from the fuel vapor purging system, such that no vapors are purged via the fuel vapor purging system. In contrast, by commanding the CPV to be open, the controller may enable the fuel vapor purging system to purge vapors from the fuel vapor canister.

Fuel vapor canister 104 operates to store vaporized hydrocarbons (HCs) from fuel system 106. Under some operating conditions, such as during refueling, fuel vapors present in the fuel tank may be displaced when liquid is added to the tank. The displaced air and/or fuel vapors may be routed from the fuel tank 128 to the fuel vapor canister 104, and then to the atmosphere through vent 136. In this way, an increased amount of vaporized HCs may be stored in fuel vapor canister 104. During a later engine operation, the stored vapors may be released back into the incoming air charge via fuel vapor purging system 200.

Conduit 150 is coupled to an ejector 140 in an ejector system 141 and includes a check valve 170 disposed therein between ejector 140 and CPV 158. Check valve 170 may prevent intake air from flowing through from the ejector into conduit 150, while allowing flow of fluid and fuel vapors from conduit 150 into ejector 140.

A conduit 151 couples conduit 150 to intake 23 at a position within conduit 150 between check valve 170 and CPV 158 and at a position in intake 23 downstream of throttle 114. For example, conduit 151 may be used to direct fuel from canister 104 to intake 23 using vacuum generated in intake manifold 116 during a purge event. Conduit 151 may include a check valve 153 disposed therein. Check valve 153 may prevent intake air from flowing through from intake manifold 116 into conduit 150, while allowing flow of fluid and fuel vapors from conduit 150 into intake manifold 116 via conduit 151 during a canister purging event.

Conduit 148 may be coupled to ejector 140 at a first port or inlet 142. Ejector 140 includes a second port 144 or inlet coupling ejector 104 to conduit 150. Ejector 140 is coupled to intake 23 at a position upstream of throttle 114 and downstream of compressor 126 via a conduit 148. During boost conditions, conduit 148 may direct compressed air in intake conduit 118 downstream of compressor 126 into ejector 140 via port 142.

Ejector 140 may also be coupled to intake conduit 118 at a position upstream of compressor 126. In some examples, a conduit 152 may couple a third port 146 or outlet of ejector 140 to intake conduit 118 at a position between air filter 174 and compressor 126. However, in other examples, as described in more detail below, ejector 140 may be coupled directly to intake conduit 118 at a position upstream of compressor 126. For example, an outlet of the ejector may be hard-mounted directly to intake passage 118 as described in more detail below.

Ejector 140 includes a housing 168 coupled to ports 146, 144, and 142. In one example, only the three ports 146, 144, and 142 are included in ejector 140. Ejector 140 may include various check valves disposed therein. For example, in some examples, ejector 140 may include a check valve positioned adjacent to each port in ejector 140 so that unidirectional flow of fluid or air is present at each port. For example, air from intake conduit 118 downstream of compressor 126 may be directed into ejector 140 via inlet port 142 and may flow through the ejector and exit the ejector at outlet port 146 before being directed into intake conduit 118 at a position upstream of compressor 126. This flow of air through the ejector may create a vacuum due to the Venturi effect at inlet port 144 so that vacuum is provided to conduit 150 via port 144 during boosted operating conditions. In particular, a low pressure region is created adjacent to inlet port 144 which may be used to draw purge vapors from the canister into ejector 140.

In some examples, ejector 140 may optionally include a shut-off valve 214 adjacent to outlet port 146 as described in more detail below. However, in other examples, a shut-off valve may not be included adjacent to outlet port 146. For example, shut-off valve 214 may be configured to close in response to certain conditions. For example, shut-off valve may be configured to close and stop air flow through the ejector in response to degradation of one or more components of the fuel vapor recovery system as described in more detail below.

Ejector 140 includes a nozzle 204 comprising an orifice which converges in a direction from inlet 142 toward suction inlet 144 so that when air flows through ejector 140 in a direction from port 142 towards port 146, a vacuum is created at port 144 due to the Venturi effect. This vacuum may be used to assist in fuel vapor purging during certain conditions, e.g., during boosted engine conditions. In one example, ejector 140 is a passive component. That is, ejector 140 is designed to provide vacuum to the fuel vapor purge system via conduit 150 to assist in purging under various conditions, without being actively controlled. Thus, whereas CPV 158 and throttle 114 may be controlled via controller 166, for example, ejector 140 may be neither controlled via controller 166 nor subject to any other active control. In another example, the ejector may be actively controlled with a variable geometry to adjust an amount of vacuum provided by the ejector to the fuel vapor recovery system via conduit 150.

During select engine and/or vehicle operating conditions, such as after an emission control device light-off temperature has been attained (e.g., a threshold temperature reached after warming up from ambient temperature) and with the engine running, the controller 166 may adjust the duty cycle of a canister vent valve solenoid (not shown) and open or maintain open canister vent valve 172. For example, canister vent valve 172 may remain open except during vacuum tests performed on the system. At the same time, controller 12 may adjust the duty cycle of the CPV solenoid 202 and open CPV 158. Pressures within fuel vapor purging system 200 may then draw fresh air through vent 136, fuel vapor canister 104, and CPV 158 such that fuel vapors flow into conduit 150.

The operation of ejector 140 within fuel vapor purging system 200 during vacuum conditions will now be described. The vacuum conditions may include intake manifold vacuum conditions. For example, intake manifold vacuum conditions may be present during an engine idle condition, with manifold pressure below atmospheric pressure by a threshold amount. This vacuum in the intake system 23 may draw fuel vapor from the canister through conduits 150 and 151 into intake manifold 116. Further, at least a portion of the fuel vapors may flow from conduit 150 into ejector 140 via port 144. Upon entering the ejector via port 144, the fuel vapors may flow through nozzle 204 from toward port 142. Specifically, the intake manifold vacuum causes the fuel vapors to flow through orifice 212. Because the diameter of the area within the nozzle gradually increases in a direction from port 144 towards port 142, the fuel vapors flowing through the nozzle in this direction diffuse, which raises the pressure of the fuel vapors. After passing through the nozzle, the fuel vapors exit ejector 140 through first port 142 and flow through duct 148 to intake passage 118 and then to intake manifold 116.

Next, the operation of ejector 140 within fuel vapor purging system 200 during boost conditions will be described. The boost conditions may include conditions during which the compressor is in operation. For example, the boost conditions may include one or more of a high engine load condition and a super-atmospheric intake condition, with intake manifold pressure greater than atmospheric pressure by a threshold amount.

Fresh air enters intake passage 118 at air filter 174. During boost conditions, compressor 126 pressurizes the air in intake passage 118, such that intake manifold pressure is positive. Pressure in intake passage 118 upstream of compressor 126 is lower than intake manifold pressure during operation of compressor 126, and this pressure differential induces a flow of fluid from intake conduit 118 through duct 148 and into ejector 140 via ejector inlet 142. This fluid may include a mixture of air and fuel, for example. After the fluid flows into the ejector via the port 142, it flows through the converging orifice 212 in nozzle 204 in a direction from port 142 towards outlet 146. Because the diameter of the nozzle gradually decreases in a direction of this flow, a low pressure zone is created in a region of orifice 212 adjacent to suction inlet 144. The pressure in this low pressure zone may be lower than a pressure in duct 150. When present, this pressure differential provides a vacuum to conduit 150 to draw fuel vapor from canister 104. This pressure differential may further induce flow of fuel vapors from the fuel vapor canister, through the CPV, and into port 144 of ejector 140. Upon entering the ejector, the fuel vapors may be drawn along with the fluid from the intake manifold out of the ejector via outlet port 146 and into intake 118 at a position upstream of compressor 126. Operation of compressor 126 then draws the fluid and fuel vapors from ejector 140 into intake passage 118 and through the compressor. After being compressed by compressor 126, the fluid and fuel vapors flow through charge air cooler 156, for delivery to intake manifold 116 via throttle 114.

Vehicle system 100 may further include a control system 160. Control system 160 is shown receiving information from a plurality of sensors 162 (various examples of which are described herein) and sending control signals to a plurality of actuators 164 (various examples of which are described herein). As one example, sensors 162 may include an exhaust gas sensor 125 (located in exhaust manifold 120) and various temperature and/or pressure sensors arranged in intake system 23. For example, a pressure or airflow sensor 115 in intake conduit 118 downstream of throttle 114, a pressure or air flow sensor 117 in intake conduit 118 between compressor 126 and throttle 114, and a pressure or air flow sensor 119 in intake conduit 118 upstream of compressor 126. Other sensors such as additional pressure, temperature, air/fuel ratio, and composition sensors may be coupled to various locations in the vehicle system 100. As another example, actuators 164 may include fuel injectors 132, throttle 114, compressor 126, a fuel pump of pump system 130, etc. The control system 160 may include an electronic controller 166. The controller may receive input data from the various sensors, process the input data, and trigger the actuators in response to the processed input data based on instruction or code programmed therein corresponding to one or more routines.

As described above, leaks, e.g., leaks due to stresses to the ejector or venturi and/or degradation in ejector system components such as hoses or ducting, may be diagnosed and detected in system components at or upstream of inlets, such as inlets 144 and 142, of the ejector. For example, leaks may be detected at port 142 or in conduit 148 upstream of port 148 and leaks may be detected at port 144 or in conduit 150 upstream of port 144 using various sensors in the engine system. However, leaks or degradation of components of the ejector system 141 at positions at outlet 146 or downstream of outlet 146, e.g., within conduit 152 may not be detected. For example, if outlet 146 degrades due to stresses and leak detection is performed by the system, then no leak may be detected at outlet 146. As another example, if conduit or hose 152 decoupled from outlet 146 or degraded, then the system may not be able to recognize that a leak is occurring.

Thus, the ejector may include one or more calculated break-lines or break-points 203 throughout a body of ejector 140 so that leaks may be directed to occur adjacent to inlets 142 and 144 where they may be detected by the system. As described in more detail below with regard to FIG. 3, the calculated break-points may be at at least one of orifice 212, ejector inlet 142, and suction inlet 144. These calculated break-lines may be configured to direct leaks away from ejector outlet 146 to the inlets 142 and 144 of the ejector. For example, at the calculated break-points a thickness of the walls of the ejector may be reduced so that if the ejector experiences stress, the ejector will degrade at one of the prescribed break-points which are positioned adjacent to the ejector inlets, e.g., ports 144 and 142, where leaks may be detected by a leak detection system. Further, in some examples, as described in more detail below, shut-off valve 214 at the ejector outlet, e.g., at outlet 146, may be configured to shut-off flow through the converging orifice 212 into intake conduit 118 upstream of compressor 126 in response to a leak detected upstream of the converging orifice and the low pressure region of the ejector.

FIG. 2 shows another example vehicle system 100 including an ejector system 141. In FIG. 2, like numbers correspond to like elements shown in FIG. 1 described above. FIG. 2 shows an example ejector system which includes an ejector or venturi 140 directly coupled to engine intake 118 at a position upstream of compressor 126 without the use of any conduit or hose between the outlet 146 of the ejector and intake conduit 118.

In FIG. 2, an outlet 146 of ejector 140 is shown directly coupled to intake conduit 118 at a position upstream of compressor 126 between compressor 126 and air filter 172. For example, as described in more detail below with regard to FIG. 3, outlet 146 may be hard-mounted to intake conduit 118 upstream of compressor 126. In this way, a hose or conduit, such as conduit 152 shown in FIG. 1, may be eliminated from the ejector system. Further, by rigidly coupling outlet 146 to intake conduit 118, stresses on ejector 140 may cause leaks to occur at one or more of the break-lines 203 adjacent to the ejector inlets 142 and 144 where leaks may be detected. In some examples, as shown in FIG. 2, a shut-off valve 214 may be optionally included adjacent to outlet 146 to shut-off flow if a leak is detected in the ejector system. However, in other examples, shut-off valve 214 may be omitted or may be positioned at other locations within ejector 140. For example, a shut-off valve may be included adjacent to inlets 142 and/or 144.

FIG. 3 shows an example ejector or venturi coupled to intake conduit 118 upstream of compressor 126 which includes calculated break-lines or break-points in the walls 302 of ejector body 168. The calculated break-points are predetermined regions of the ejector where breaks due to stresses on the ejector body are designed to preferentially occur. Like numbers shown in FIG. 3 correspond to like elements shown in FIGS. 1 and 2 described above. Ejector 140 includes a nozzle 204 forming an orifice or a restriction which converges in a direction from a motive inlet 142 towards outlet 146. In particular, a distance 329 between inner walls 330 of nozzle 204 decreases in a direction from motive inlet 142 toward motive outlet 146 along a central axis 306.

FIG. 3 shows a motive outlet 146 of ejector 140 directly coupled within intake conduit 118 at a position in intake conduit 118 upstream of compressor 126. For example, walls 302 of the ejector may be hard-mounted to walls 304 of intake conduit 118 so that the motive outlet of the ejector is directly coupled to intake conduit 118 without using any tubes, hoses, or other conduits positioned between the ejector body and the intake conduit. For example, walls 302 of ejector 140 may be welded to walls 304 of intake conduit 118 or may be rigidly coupled in any suitable way so that stresses on the body of the ejector cause one or more of the break-lines or break-points to degrade.

Ejector 140 may be coupled in any suitable way and at any suitable angle with intake conduit 118. For example, a central axis 306 of ejector 140 extending from first inlet 142 toward outlet 146 may be substantially perpendicular to a direction of flow of gases in intake conduit 118. However, in other examples, axis 306 may form an angle with the direction of flow of gases in intake conduit 118. Further, ejector 140 may be coupled to intake conduit 118 at any position of the ejector adjacent to an outlet of the converging nozzle 204. For example, ejector 140 may be coupled to intake conduit 118 at a position adjacent to the low pressure region 308 near suction inlet 144. Further, in some examples, at least of portion of ejector 140 may extend into an interior of intake conduit 118 at the junction 310 between ejector 140 and intake conduit 118. However, in other examples, ejector 140 may not extend into the interior of the intake conduit at the junction 310. For example, walls 302 of the ejector may be integrally formed with walls 304 of intake conduit 118 at junction 310. Further, in some examples, as described above, a shut-off valve may be disposed adjacent to outlet 146 of ejector 140 and/or at other locations in the ejector. Though FIG. 3 shows ejector 140 coupled directly to intake conduit 118, in other examples, such as shown in FIG. 1 described above, outlet 146 may be coupled to intake conduit 118 via a hose or ducting, such as hose 152, extending from the ejector 140 to the intake 118.

Ejector 140 may include one or more calculated break-lines or break-points at one or more locations along body 168 of ejector 140. Examples of break-lines are shown at 312, 314, 316, and 318 in FIG. 3. It should be understood that the break-lines shown in FIG. 3 are exemplary in nature and may be positioned at varying locations along the ejector. Further, in some example, the ejector may include only one break line, e.g., one of break-lines 312, 314, 316, or 318. However, in other examples, the ejector may include two or more break-lines, e.g., two or more of break-lines 312, 314, 316, and 318.

At the break-lines a thickness of the wall of the ejector may be decreased so that a break occurs at the break line when the body of the ejector undergoes stress or otherwise degrades. For example, a rivet or indentation may be formed in the wall of the ejector at a break-point. Further, in some examples, a break-line may extend into the walls of the ejector around an outer circumference of the ejector body at the break point.

The break-points may be stress risers positioned at pre-determined regions of the ejector body. For example, a break-point may comprise an indented stress rising joint or an indented ring traversing around an exterior of the ejector at one or more pre-determined locations. The ejector may not include any break-points at or adjacent to motive outlet 146. In particular, no break-points may be included in a region of the ejector downstream of suction inlet 144 between suction inlet 144 and intake conduit 118. However, one or more break-points may be included at and upstream of suction inlet 144, e.g., at or in restriction 212 and at, in, or adjacent to motive inlet 142.

For example, ejector 140 may include a break line 312 extending around the circumference of suction inlet 144. In some examples, break line 312 may be substantially perpendicular to a central axis 320 of suction inlet 144. However, in other examples, break line 312 may form an angle with central axis 320 of suction inlet 144. As another example, ejector 140 may include a break line 314 extending around the circumference of first inlet 142. For example, break line 314 may be positioned upstream of nozzle 204. In some examples, break line 314 may be substantially perpendicular to central axis 306 of ejector 140. However, in other examples break line 314 may form an angle with central axis 320 of suction inlet 144. As still another example, ejector 140 may include a break line 316 extending around the circumference of walls of the ejector at a position around nozzle 204. This break line may be substantially perpendicular to central axis 306 of ejector 140. However, in other examples, a break line 318 may be formed around a circumference of the ejector around the nozzle 318 and may form an angle with central axis 306.

FIG. 4 shows an example method 400 for a dual path purge system, such a dual path purge system 171 shown in FIGS. 1 and 2. In method 400, an ejector system, such as ejector system 141, may be used during boosted engine operation to purge fuel vapor from a canister into the engine intake. Further, leaks may be diagnosed at locations in the ejector system upstream from the ejector outlet and mitigating actions may be performed in response to a detected leak.

At 402, method 400 includes determining if a purge request has occurred. For example, a fuel vapor purge event may be initiated in response to an amount of fuel vapor stored in the fuel vapor canister greater than a threshold amount. Further, purging may be initiated when an emission control device light-off temperature has been attained. If a purge request has occurred, then a purging event may be initiated and controller 12 may adjust the duty cycle of the CPV solenoid 202 and open CPV 158. Pressures within fuel vapor purging system 200 may then draw fresh air through vent 136, fuel vapor canister 104, and CPV 158 such that fuel vapors flow into conduit 150.

In response to purge initiation at 402, method 400 proceeds to 404. At 404, method 400 includes determining if boosted engine operation is present. Boost conditions may include conditions during which the compressor is in operation. For example, the boost conditions may include one or more of a high engine load condition and a super-atmospheric intake condition, with intake manifold pressure greater than atmospheric pressure by a threshold amount.

If the engine is not operating with boost at 404, then vacuum conditions may be present and method 400 proceeds to 408. Vacuum conditions may include intake manifold vacuum conditions. For example, intake manifold vacuum conditions may be present during an engine idle condition, with manifold pressure below atmospheric pressure by a threshold amount.

At 408, method 400 includes supplying fuel vapor to the intake downstream of the compressor. For example, the vacuum in the intake system 23 may draw fuel vapor from the canister through conduits 150 and 151 into intake manifold 116.

However, if at 404, boosted engine operating conditions are present, then method 400 proceeds to 410. At 410, method 400 includes directing air through the ejector. For example, fresh air may be directed into intake passage 118 at air filter 174. During boost conditions, compressor 126 pressurizes the air in intake passage 118, such that intake manifold pressure is positive. Pressure in intake passage 118 upstream of compressor 126 is lower than intake manifold pressure during operation of compressor 126, and this pressure differential induces a flow of fluid from intake conduit 118 through duct 148 and into ejector 140 via ejector inlet 142. This fluid may include a mixture of air and fuel, for example. After the fluid flows into the ejector via the port 142, it flows through the converging orifice 212 in nozzle 204 in a direction from port 142 towards outlet 146.

At 412, method 400 includes drawing fuel vapor from the canister into the ejector. For example, because the diameter of the nozzle gradually decreases in a direction of this flow, a low pressure zone is created in a region of orifice 212 adjacent to suction inlet 144. The pressure in this low pressure zone will be lower than a pressure in duct 150. When present, this pressure differential provides a vacuum to conduit 150 to draw fuel vapor from canister 104. This pressure differential may further induce flow of fuel vapors from the fuel vapor canister, through the CPV, and into port 144 of ejector 140.

At 414, method 400 includes supplying fueling vapor to the intake upstream of the compressor. For example, upon entering the ejector, the fuel vapors may be drawn along with the fluid from the intake manifold out of the ejector via outlet port 146 and into intake 118 at a position upstream of compressor 126. Operation of compressor 126 then draws the fluid and fuel vapors from ejector 140 into intake passage 118 and through the compressor. After being compressed by compressor 126, the fluid and fuel vapors flow through charge air cooler 156, for delivery to intake manifold 116 via throttle 114.

At 416, method 400 includes determining if entry conditions for leak testing are met. For example, method 400 may judge to perform a diagnostic leak test after a threshold amount of time between leak tests has been exceeded. In another example, a diagnostic leak test of the ejector system may be performed when vacuum is not being produced at a desired rate by the ejector system.

If entry conditions for leak testing are met at 416, method 400 proceeds to 418. At 418, method 400 includes diagnosing leak upstream of the ejector orifice. In one example, a compressor is operated at a steady speed while throttle position is constant and when engine speed is constant. If less than a desired pressure develops downstream of the compressor, it may be determined that there is a leak upstream of the ejector orifice. Further, in some examples, two conditions including pressure less than a threshold downstream of the compressor and vacuum being provided by the ejector system at less than a threshold rate may be conditions for determining leakage of a component upstream of the ejector orifice.

At 420, method 400 includes diagnosing leaks upstream of a low pressure region of the ejector. In one example, a valve is opened to start flow of a motive fluid through the ejector. The motive fluid may be air and the air may be compressed via a turbocharger. All vacuum consumers may be commanded to a closed state and pressure within the components upstream of the low pressure region of the ejector may be sensed by one or more pressure sensors. Air is drawn from components upstream of the low pressure region of the ejector to the ejector, provided limited leakage is present. The motive fluid is returned to the engine with air from the components upstream of the low pressure region of the ejector at a location upstream of the compressor. If less than a threshold amount of vacuum develops in the components upstream of the low pressure region of the ejector, it may be determined that there is a leak in one or more components upstream of the low pressure region of the ejector.

At 422, method 400 includes determining if a leak is detected. For example, as described above, leaks may be diagnosed or detected from the ejector that are upstream of the converging orifice and the low pressure region of the ejector. Further, since break-lines are included in the ejector body as described above, leaks are directed from the outlet of the ejector to upstream of the converging orifice and the low pressure region of the ejector.

If a leak was detected at 422, method 400 proceeds to 424. At 424, method 400 may optionally include closing a shut-off valve, if present, to discontinue flow through the ejector. For example, if a leak is detected at or upstream of ejector inlets 142 and 144 then a shut-off valve, e.g., shut-off valve 214, may be adjusted to discontinue flow through the converging orifice of the ejector and into the engine intake upstream of the compressor.

At 426, method 400 includes indicating a degradation. For example, if a leak is determined at 418 or 420, method 400 may provide an indication to the driver to service the engine. Further, method 400 may store leak information in memory and set a diagnostic code to alert an operator to take mitigating actions. For example, a no purge flow signal may be sent to an electronic control module (ECM) with a degradation code.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described diagnostic routines. The subject matter of the present disclosure includes all novel and nonobvious combinations and subcombinations of the various systems and configurations, and other features, functions, and/or properties disclosed herein.

The invention claimed is:

1. A multi-path purge system for an engine, comprising: an ejector including a restriction, first and second inlets, an outlet hard-mounted to an intake of the engine, and a plurality of break-points at which a thickness of a wall of the ejector is reduced via an indented ring traversing around an exterior of the ejector, the plurality of break-points including a break-point at each of the first and second inlets,
wherein there are no break-points at the outlet of the ejector.

2. The system of claim 1, further comprising a shut-off valve coupled to the outlet.

3. The system of claim 2, wherein the shut-off valve is configured to close in response to a leak detected upstream of the outlet.

4. The system of claim 1, wherein the restriction converges from the first inlet towards the second inlet.

5. The system of claim 1, wherein the first inlet is coupled to the intake between a throttle and compressor of the engine and the second inlet is coupled to a fuel vapor canister.

6. The system of claim 5, wherein the second inlet is coupled to the canister via a conduit, the conduit including a canister purge valve disposed therein, and wherein the conduit is coupled to the intake downstream of the throttle at a location in the conduit between the canister purge valve and the second inlet.

7. The system of claim 1, wherein the plurality of break-points further includes a break-point at the restriction.

8. The system of claim 7, wherein the break-point at the restriction is angled relative to a central axis of the ejector extending from the first inlet to the outlet.

9. The system of claim 1, wherein the plurality of break-points is configured to direct leaks away from the outlet of the ejector to the first and second inlets of the ejector.

10. A multi-path purge system for an engine, comprising:
an ejector including an orifice, first and second inlets, an outlet, and a plurality of break-points at which a thickness of a wall of the ejector is reduced via an indented ring traversing around an exterior of the ejector, including a break-point at the orifice, the first inlet, and the second inlets; and
a shut-off valve coupled to the outlet,
wherein no break-points are arranged at the outlet.

11. The system of claim 10, wherein the outlet is hard-mounted to an intake of the engine.

12. The system of claim 10, wherein the orifice converges from the first inlet towards the second inlet and wherein the orifice extends at least partially into an intake of the engine.

13. The system of claim 10, wherein the shut-off valve is configured to close in response to a leak detected upstream of the outlet.

14. The system of claim 10, wherein the first inlet is coupled to the intake between a throttle and compressor of the engine and the second inlet is coupled to a fuel vapor canister.

15. The system of claim 14, wherein the second inlet is coupled to the canister via a conduit, the conduit including a canister purge valve disposed therein, and wherein the conduit is coupled to the intake downstream of the throttle at a location in the conduit between the canister purge valve and the second inlet.

16. The system of claim 10, wherein the break point at the orifice is angled relative to a central axis of the ejector extending from the first inlet to the outlet.

17. A method for a vehicle, comprising:
in response to a purge request during a boost condition:
directing air from an engine intake downstream of a compressor through a converging orifice in an ejector and into an engine intake upstream of the compressor, wherein an outlet of the orifice is hard-mounted to the engine intake upstream of the compressor, and wherein the ejector includes an indented stress rising joint;

drawing an amount of fuel vapor from a fuel vapor canister via a low pressure region of the ejector; and supplying the amount of fuel vapor to the engine intake upstream of the compressor via the outlet hard-mounted to the engine intake upstream of the compressor;

diagnosing leaks from the ejector that are upstream of the converging orifice and the low pressure region of the ejector; and shutting-off flow through the converging orifice in the ejector and into the engine intake upstream of the compressor in response to a leak detected upstream of the converging orifice and the low pressure region of the ejector.

18. The method of claim 17, further comprising indicating a degradation of the ejector in response to a leak detected upstream of the converging orifice and the low pressure region of the ejector.

\* \* \* \* \*